W. B. WESCOTT.
CINEMATOGRAPHIC APPARATUS.
APPLICATION FILED JUNE 25, 1917.

1,417,005.

Patented May 23, 1922.
5 SHEETS—SHEET 1.

Inventor.
William B. Wescott,
by Rohrte Rohrte & Cushman
his Attorneys

W. B. WESCOTT.
CINEMATOGRAPHIC APPARATUS.
APPLICATION FILED JUNE 25, 1917.

1,417,005.

Patented May 23, 1922.

Inventor:
William B. Wescott,
by Rohrte Rohrte & Cushman
his Attorneys.

W. B. WESCOTT.
CINEMATOGRAPHIC APPARATUS.
APPLICATION FILED JUNE 25, 1917.

1,417,005.

Patented May 23, 1922.
5 SHEETS—SHEET 3.

Inventor:
William B. Wescott,
by Rohrte Rohrte Kuehman
his Attorneys.

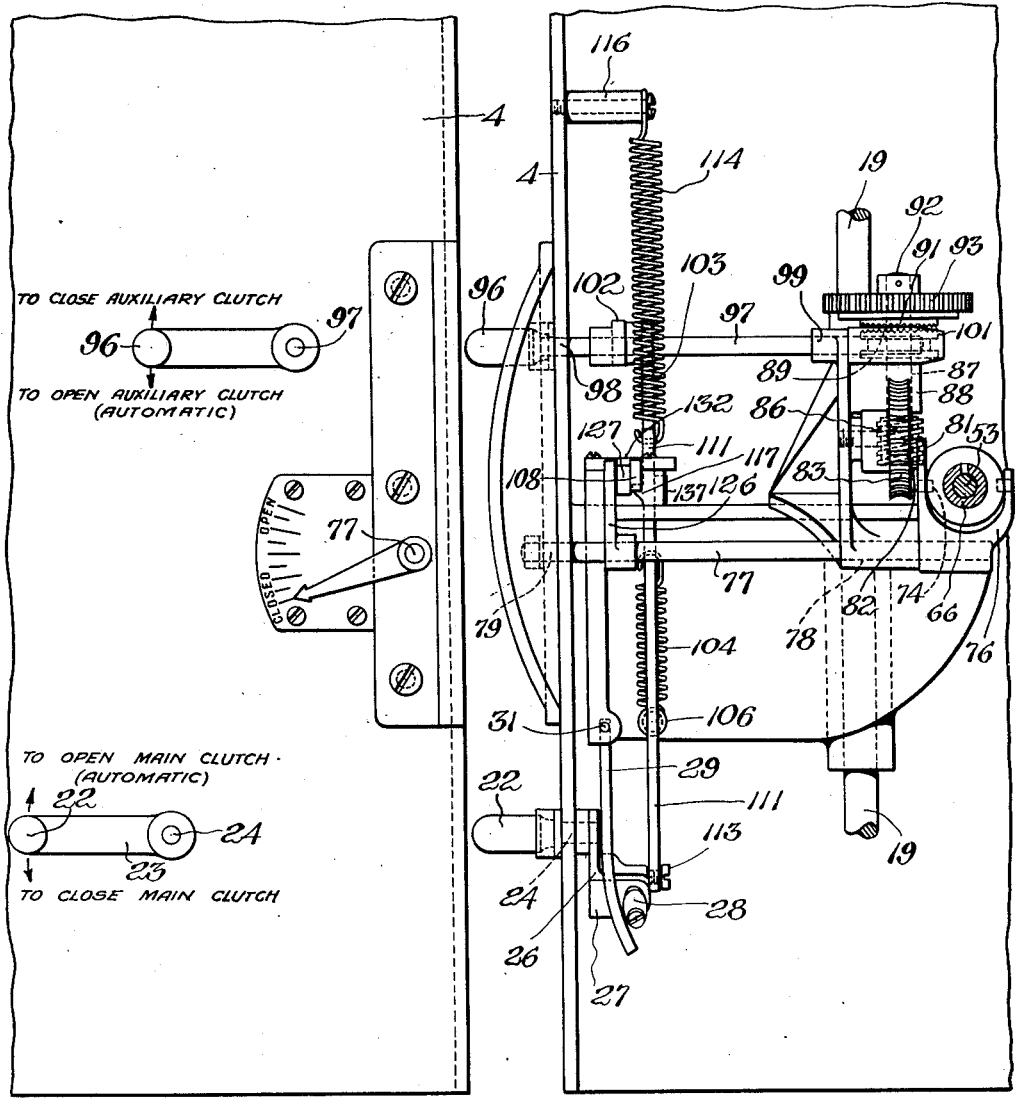

W. B. WESCOTT.
CINEMATOGRAPHIC APPARATUS.
APPLICATION FILED JUNE 25, 1917.
1,417,005.
Patented May 23, 1922.
5 SHEETS—SHEET 5.
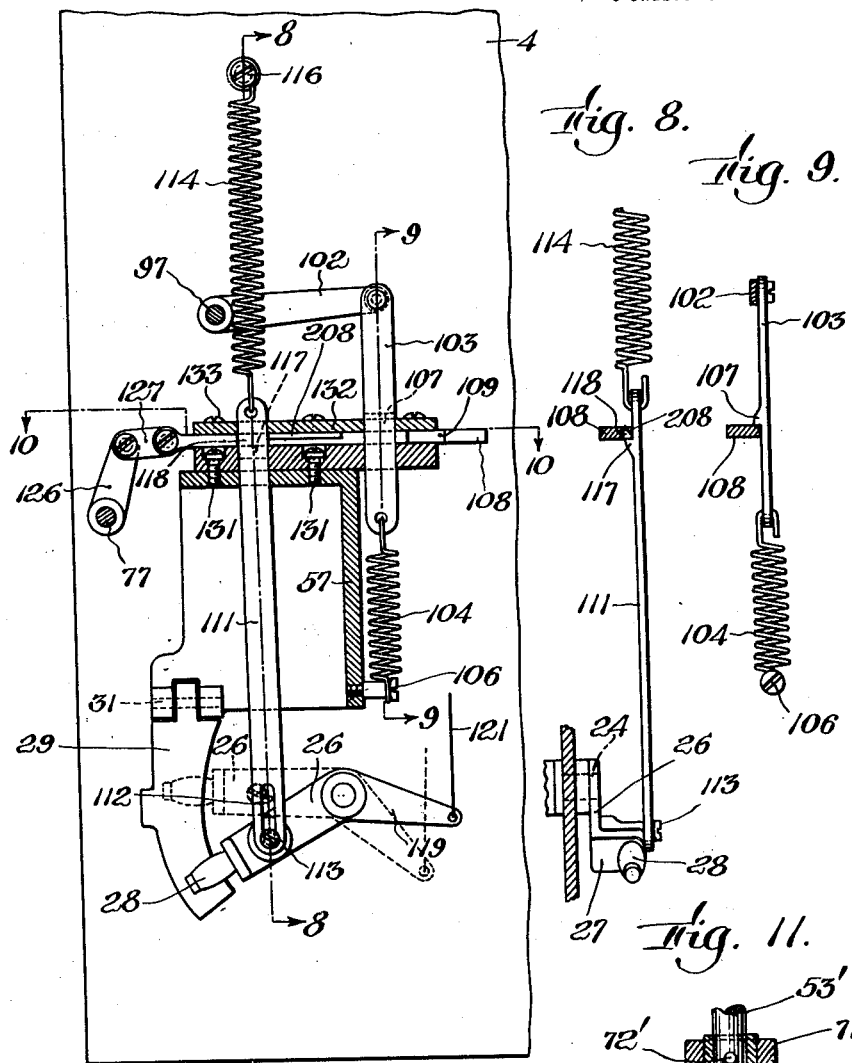
Fig. 7. Fig. 8. Fig. 9. Fig. 11.
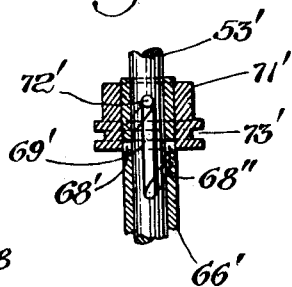
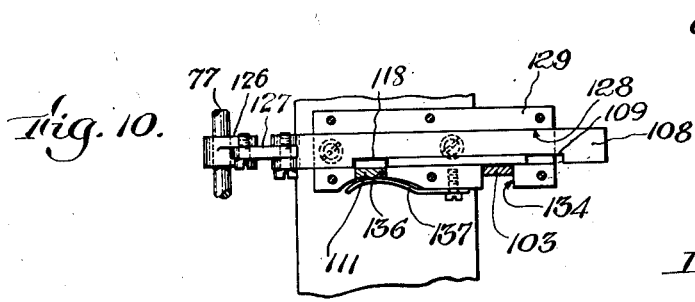
Fig. 10.
Inventor:
William B. Wescott,
by Roberts Roberts Cushman
his Attorneys.

UNITED STATES PATENT OFFICE.

WILLIAM BURTON WESCOTT, OF WELLESLEY HILLS, MASSACHUSETTS, ASSIGNOR TO KALMUS, COMSTOCK & WESCOTT, INCORPORATED, OF BOSTON, MASSACHUSETTS, A CORPORATION OF MASSACHUSETTS.

CINEMATOGRAPHIC APPARATUS.

1,417,005.  Specification of Letters Patent.  Patented May 23, 1922.

Application filed June 25, 1917. Serial No. 176,652.

*To all whom it may concern:*

Be it known that I, WILLIAM BURTON WESCOTT, a citizen of the United States, and resident of Wellesley Hills, in the county of Norfolk and State of Massachusetts, have invented new and useful Improvements in Cinematographic Apparatus, of which the following is a specification.

This invention relates to cinematography, whether exposing, printing or projecting, but more particularly to cinematographic printing of the multiplex type, that is, of the type adapted to print a plurality of series of complemental images.

In the projection of motion pictures it has been found desirable in changing from one scene to another, instead of making the change abruptly, gradually to merge the following scene into the preceding scene so that as one scene fades out the other scene is gradually substituted, this process being known as a "dissolving" process. In the production of ordinary black and white pictures this dissolving phenomenon is usually effected by varying the size of the diaphragm opening in the camera while exposing the negatives from which the positives exhibiting the dissolving phenomenon are produced. That is, while exposing the latter portion of one series of views the diaphragm is gradually closed and while exposing the first portion of the succeeding series of views the diaphragm is gradually opened. Then in printing the positives the two series of views are overlapped by printing the first portion of the second series over the latter portion of the first series.

While this method is fairly satisfactory for black and white cinematography it involves a number of disadvantages which I purpose to overcome. In the former process the rate of decrease and increase in the intensity in the latter and former portions of the overlapped series of views is finally determined in the camera so that, if incorrect, it cannot be corrected either in printing or projecting and all pictures produced from the negatives will be defective. While a skilled photographer can usually determine the proper time to begin to reduce the intensity of the first series, he frequently makes mistakes, and unless highly skilled an operator is usually too much occupied with other matters properly to attend to this detail. Moreover, it is frequently desirable to eliminate the last or the first portion of a series of views and in the old process this involves cutting away the diminuendo or crescendo portions of the film and sacrificing the dissolving phenomenon.

However, a more serious objection to the described dissolving process is met with in the production of color pictures by multiplex films, that is, by films having two or more series of complemental images, as for example one series recording the red aspect of the object field and a corresponding or complemental series recording the green aspect of the object field. As fully described in the application of Daniel F. Comstock, Sr. No. 112,378 the contrast gradients of the images in the respective complemental series, which are produced by the components of light of different dominant hues, are different, the images formed by the red component of light having a steeper contrast gradient than the images formed by the green component, in the two-color process for example. If the two contrast gradients coincide at the normal degree of exposure they diverge as they extend downwardly from the point of intersection, and as the intensity of the images of the respective complemental series are decreased their contrast gradients differ more and more. Moreover, in the ordinary panchromatic negative film employed in motion picture work, and particularly in the film used in color work, the emulsion is exceedingly sensitive and the straight portion of the contrast gradients are correspondingly short. Thus, if the complemental pictures of normal intensity have the proper relative color values, in the old dissolving process where the dissolving effect is introduced in the original negatives by varying the diaphragm opening in the camera, the degree of exposure is varied either upwardly or downwardly along the contrast gradients; and, owing to the fact that the contrast gradients for the respective complemental series of images, for example the red series and the green series, diverge and have only short straight portions, the pictures of diminished intensity will not have proper relative color values, particularly in the region below the straight portions of the contrast gradients. The result is that if the complemental pictures of normal intensity have the proper relative color values the diminuendo or crescendo pictures will not have the proper relative color values but will be too green in the shadows.

The principal object of the present invention is to overcome the above and other difficulties and to obtain a more convenient and adaptable method and means for effecting the dissolving phenomenon either in black and white or color cinematography. To this end the invention, in its preferred form involves no variation of the intensity of the end portions of the original negative film as in the old process, but on the contrary I preferably produce the diminuendo and crescendo effects in printing the positive film from the negative films. The succeeding series of views are preferably overlapped upon the positive film as in the old process but unlike the old process the intensity of the printing light is gradually diminished in printing the latter portion of the first series and the intensity of the light is gradually increased in printing the overlapping portion of the suceeding series, it being understood that the diminuendo and crescendo portions of the two series which are overlapped are preferably substantially equal in length. In projecting the two series of images the positive film is run through the projector continuously and upon reaching the end of the first series of views the first series gradually merges into the second series.

By my new method the camera operator, who has many details to occupy his attention and who is frequently required to operate under difficult conditions, is relieved of attending to the dissolving effect. In printing the positives from the negatives the provision for the dissolving phenomenon can be more carefully and accurately made; and, in the event that the first positives do not display the desired effect, the printing can be so varied as to provide the desired effect in subsequent positives. Moreover, should portions of the negative films be undesirable they may be eliminated without destroying the dissolving effect inasmuch as the provision for the effect is first made in the positives.

However, I believe the most unique and desirable use of the present invention to be in the production of multiplex films, whether the complemental image be disposed side by side as in the additive processes or in superposition as in the subtractive processes. The particular utility of the invention for color work is due in part to the particular stage of the process of exposing, printing and projecting, in producing motion pictures, in which I introduce the dissolving effect, and in part to the adaptability of my improved method of producing the described diminuendo and crescendo effects. In applying my invention to the subtractive process of color cinematography the respective series of complemental positives may be printed either independently at different times or they may be printed concomitantly as disclosed in my prior application Sr. No. 149,791, filed Feb. 28, 1917. Moreover, either white light, similarly colored light or, as in prior application Sr. No. 112,378 above referred to, light of different colors may be employed to print the respective complemental series. In applying the invention to the additive process of color cinematography the respective series of positives may be printed in any desired manner, as for example in the manner disclosed in the application of Daniel F. Comstock, Sr. No. 136,137, filed Dec. 11, 1916. In either event the difficulties of the old dissolving method are overcome as will now be described.

Unlike the panchromatic negative films, which have exceedingly sensitive emulsions and correspondingly short straight portions in their contrast gradients, the ordinary positive films are relatively very slow and have contrast gradients whose straight portions are long. The straight portions of the gradients for each of the complemental series of positive images can be made coincident or at least parallel by suitably adjusting the light values in the printer and the degrees of development in developing the respective series of positives, or by suitably choosing the color values of the printing light. Thus owing to the relatively great length of the straight portions of the positive gradients and owing to the fact that the slope of the gradients of the respective complemental series may be made substantially equal, unbalancing of the color values of the positive series due to the relatively great decrease of the intensity of the printing light, in producing the diminuendo and crescendo portions of the positive films, is avoided, the decrease of intensity not extending much if any below the straight portions of the contrast gradients. Thus, in introducing the dissolving effect in the printing process instead of in the exposing process the relative color values of the complemental images projected upon the screen are not unbalanced during the transition from one scene to another. The advantages resulting from my new method of introducing the dissolving effect, wherein the shutter opening is gradually varied in size, will be apparent from the detailed description of the mechanism for the purpose as hereinafter set forth.

Other objects of the invention, such as adequately ventilating cinematographic apparatus without admitting light and otherwise improving such apparatus, will be apparent from the following description and the accompanying drawings, in which,—

Figure 5 is an elevational view of a portion of the left side of the apparatus;

Figure 6 is a rear view of a portion of the apparatus, the lamp housing being removed;

Figure 7 is an elevational view from the right-hand side of a portion of the interior mechanism, parts being shown in section and parts being omitted;

Figure 8 is a detail sectional view taken on line 8—8 of Fig. 7, a part of the spring being broken away;

Figure 9 is a detail sectional view taken on line 9—9 of Fig. 7;

Figure 10 is a detail sectional view taken on line 10—10 of Fig. 7; and

Figure 11 is a detail sectional view of a modified mechanism for rotating the auxiliary shutter relatively to the main shutter.

Figure 1:
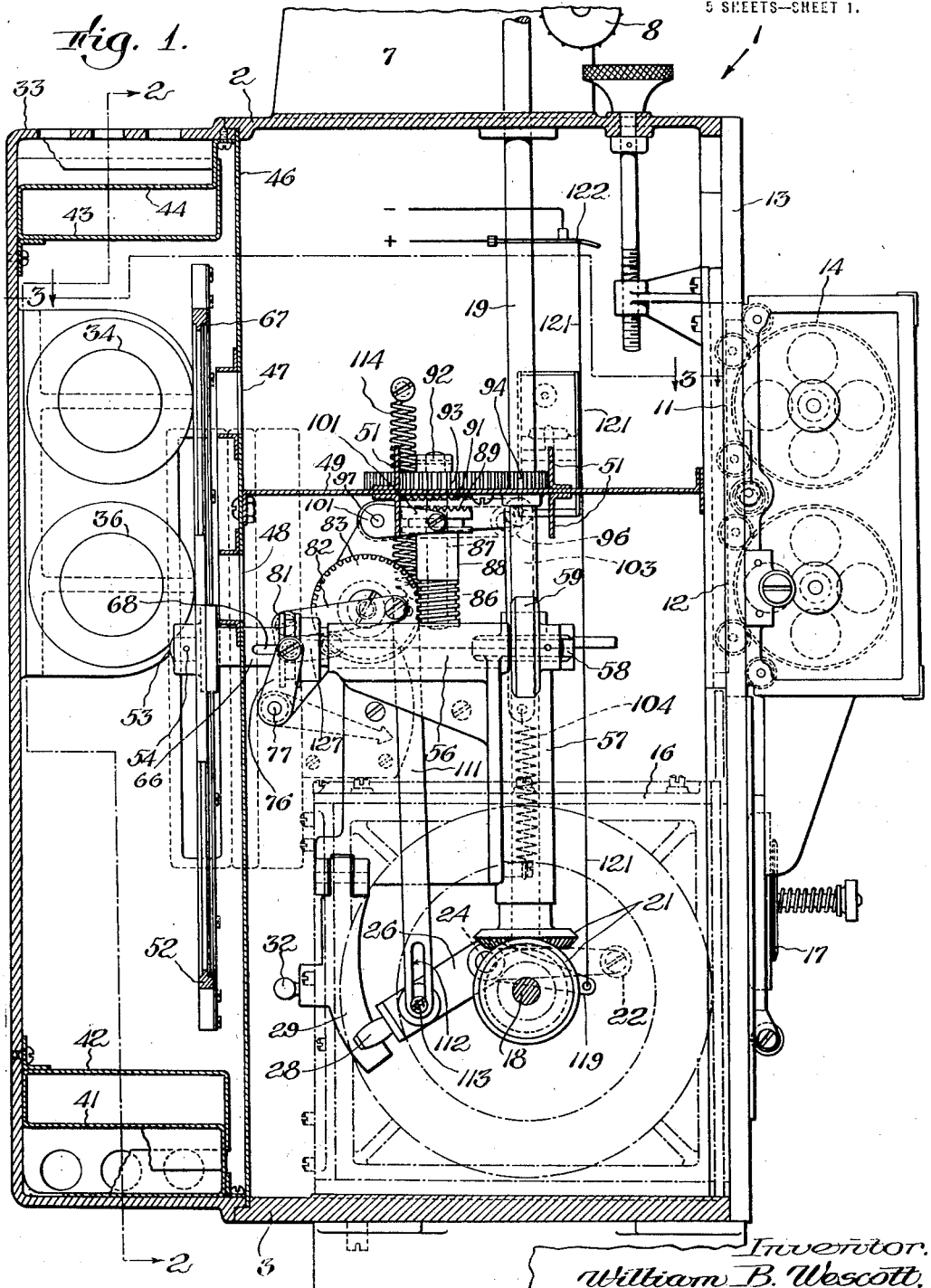
Figure 1 is a right-hand elevation of one embodiment of my invention, showing parts in section and other parts broken away.

In general the particular embodiment of my invention illustrated in the drawings is similar to that disclosed in my former application No. 149,791, and is comprised as follows: The main casing 1, which is open at its rear and front, comprises a top 2, a bottom 3, a left side 4, and a right side 6. On the top 2 is mounted an upright 7 adapted to carry the negative and positive feed reels so as to supply the films to the machine over the sprocket wheel 8 and rollers 9 past the film-gate apertures 11 and 12 in the film-gate 13 which covers the front of the housing 1. As disclosed in the said former application, a film-gate cover 14 is pivotally mounted on the film-gate 13 to position and control the films as they pass the apertures 11 and 12. In the lower right-hand portion of the casing 1 is mounted a cam box 16 containing cams for intermittently feeding the films through the film-gate, pressure means 17 being mounted on the lower forward side of the film-gate to control the film throughout the region in which it is engaged by the intermittent advancing means. The cam mechanism within the casing 16 is driven by means of a shaft 18 extending outwardly through the right-hand side 6 of the casing to a crank or motor or other suitable source of power. The feed reels and sprockets mounted on the upright 7 are driven by the vertical shaft 19, which is connected with the horizontal shaft 18 through the medium of bevel gears 21.

The shaft 18 is preferably provided with a clutch (not shown) on the outside of the casing at the right-hand side to connect and disconnect it to and from the source of power, this clutch being controlled by a handle 22 mounted on the left-hand side 4 of the casing. The handle 22 is connected by means of arm 23 (Figs. 3 and 5) to a shaft 24 extending through the wall 4 of the casing. On the inner end of the shaft 24 is radially mounted an arm 26 (Figs. 2 and 6) having on its outer end a flange 27 turned inwardly in parallelism with the shaft 24. On the inner end of the flange 27 is rotatably mounted a roller 28 which is adapted to engage an actuate arm 29 pivotally mounted at 31 on the inside of the casing. The depending actuate member 29 is connected to the clutch (not shown) on the right-hand side of the casing through the medium of a connecting link 32. When the clutch handle 22 is moved upwardly the roller 28 is caused to engage the in-turned lower portion of member 29 so as to force it to the left and thereby close the main clutch through the medium of connecting link 32.

Over the rear of the casing 1 is mounted a lamp housing 33 containing lamps 34 and 36 for projecting light through the respective apertures 11 and 12, the lamps being supported in sockets 37 and 38 which are mounted on the rear wall of the lamp housing by means of a bracket 39. At the top and bottom of the lamp housing 33 are provided ventilating means for allowing a current of air to pass through the housing so as to carry off the heat radiated by the lamps, the ventilating means being so constructed and arranged as to prevent light passing through the housing, this being desirable for the reason that the positive film passing from the feed reel through the film-gate on the outside of the casing to the take-up reel would be fogged if light were permitted to radiate outwardly through the housing to the undeveloped film. The particular embodiment of the ventilating means illustrated in the drawings comprises partition members 41, 42, 43 and 44 (Fig. 2) disposed horizontally in spaced relationship to each other and to the top and bottom of the lamp housing, the partitions 41 to 44 and the housing 33 having openings O therein so that air may pass therethrough, the heat of the lamps producing an upward circulation of air through the housing. The openings O in the partitions and housing, respectively, are arranged out of alinement so that light passing through one opening will be largely intercepted by the next partition or wall. In order to further obstruct passage of light through the openings, ribs R are preferably arranged to extend in staggered relationship from the opposing faces of the channels formed by the partitions and the walls and, if desired, in the channels formed by the adjacent partitions. In this way substantially no light is permitted to pass out of the housing, but nevertheless a good draft of air is permitted to circulate upwardly through the housing.

Between the casing 1 and the lamp housing 33 is preferably provided a diaphragm 46 having apertures 47 and 48, respectively, in alinement with the light sources and film-gate apertures. Between the apertures 47 and 48 is provided a diaphragm 49 which preferably extends to the film-gate on the front and to the side walls 4 and 6. In order to prevent light being reflected from the diaphragm 49 to the film-gate apertures so as to pass through the films obliquely to the course of the respective beams of light, ribs 51 are preferably mounted transversely on the upper and lower sides thereof. The main shutter 52 employed for obstructing the passage of light to the film-gate apertures while the films are being advanced is fixedly mounted on shaft 53 by means of a pin and collar 54. The shaft 53 is mounted to rotate in the bearing 56 which is preferably formed in a bracket 57 mounted on the side 4 of the main casing. The shaft 53 is arranged to receive power from the vertical shaft 19 through the medium of spur gears 58 and 59.

Figure 2:
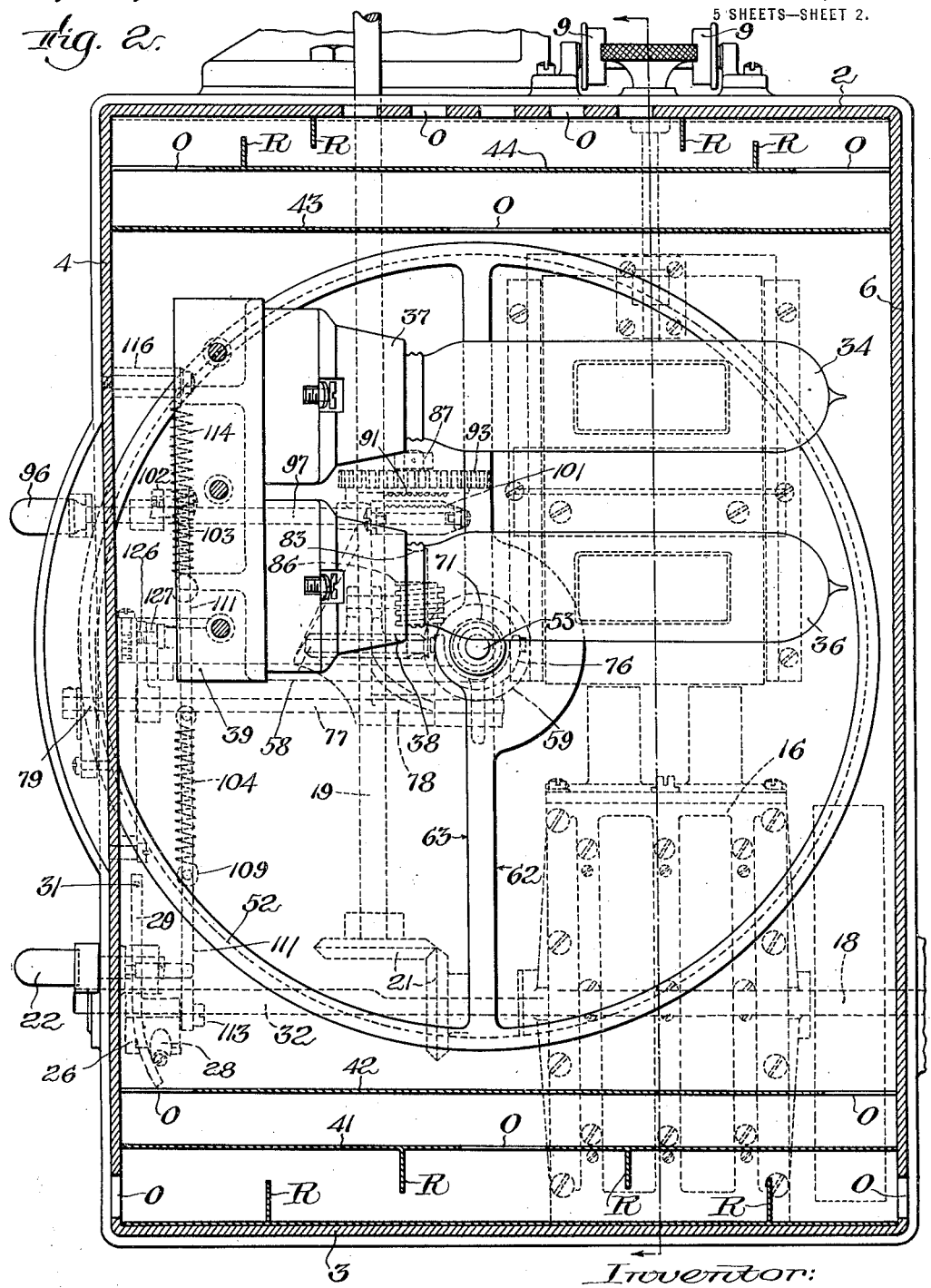
Figure 2 is a rear elevation of the apparatus showing parts in section.
Figure 4:
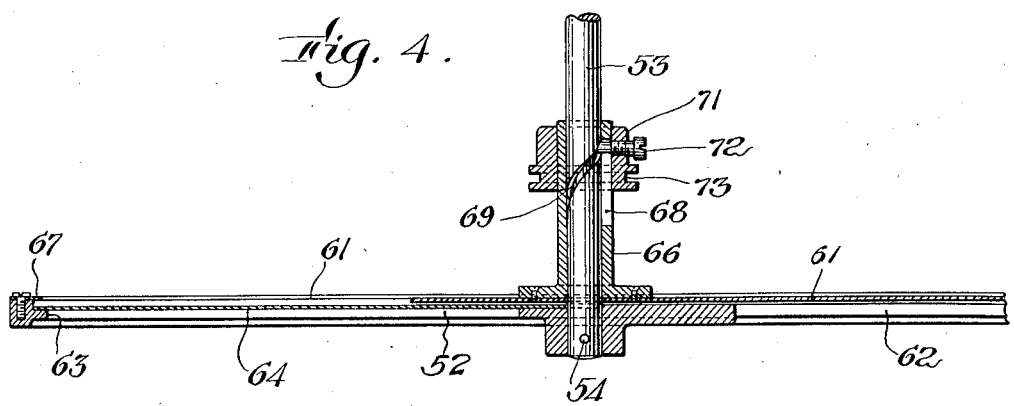
Figure 4 is a horizontal sectional view through the shutters and driving mechanism, parts being broken away.

In order to produce the dissolving effect in the printing process as above described, the main shutter 52 is provided with an auxiliary shutter 61 which is so associated with the main shutter that it not only rotates in synchronism with the main shutter but so that it may be moved relatively to the main shutter, either while the main shutter is in motion or at rest, so as to vary the effective size of the shutter opening 62. As shown in Fig. 2, the main shutter 52 has two openings 62 and 63, each extending throughout substantially 180°. However, as shown in Fig. 4 the opening 63 is at all times completely covered by a semi-circular diaphragm 64 which is permanently secured to the main shutter. The auxiliary shutter 61 is secured to a sleeve 66 which surrounds the shaft 53. On the inner side of the outer rim of the main shutter 52 is mounted a thin annular member 67 (Fig. 4), the member being arranged to extend inwardly somewhat past the inner periphery of the rim so as to form a channel into which extends the outer periphery of the auxiliary shutter. When the sleeve 66 is rotated relatively to the shaft 53 the auxiliary shutter 61 is rotated in the channel formed by member 67 and the auxiliary shutter is preferably substantially semi-circular so that in one position it will completely close the opening 62 in the main shutter and in a position annularly displaced 180° from the first position it will completely uncover the opening 62.

As shown in Fig. 4, one means for rotating the auxiliary shutter relatively to the main shutter comprises a recess 68 longitudinally disposed in the sleeve 66, a slot 69 spirally disposed in the shaft 53 and a collar 71 sliding on sleeve 66 and carrying a pin 72 extending entirely through the collar and slot 68 and into the groove 69. When the pin 72 is reciprocated longitudinally of the shaft 53 along the slot 68, by means of collar 71, the sleeve 66 is rotated relatively to the shaft 53 so that the pin 72 follows along the spiral slot 69, thus rotating the auxiliary shutter relatively to the main shutter. The spiral slots 69 are of such length that the auxiliary shutter will be rotated through 180° when the pin 72 is reciprocated the full length of slot 68. An annular channel 73 is provided in the collar 71 so that it may be reciprocated while rotating with shaft 53 by means of pins 74 (Fig. 3) extending thereinto on opposite sides of the collar. Thus, by shifting the collar 71 along the shaft the shutter opening can be controlled at will.

In the modified embodiment of the shutter closing means shown in Fig. 11 two slots 68' and 68'' are spirally disposed in the sleeve 66' and the slot 69'' in the shaft 53' is disposed longitudinally of the shaft and extends entirely therethrough. At its opposite ends a pin 72' is fixedly mounted in the opposite sides of the collar 71' and intermediate the ends it extends through the slots 68', 68'' and 69' in the sleeve 66' and the shaft 53' respectively. The spiral slots 68' and 68'' in the sleeve 66' extend in opposite directions in such manner that the pin 72' may follow therealong at its opposite ends as it rotates and reciprocates with reference to the axis of the shaft 53'.

The mechanism for shifting the collar 71 along the sleeve 66 and shaft 53, either while the shaft and sleeve together with the shutters fixedly connected thereto are rotating or at rest, is comprised as follows: A U-shaped yoke member 76, which carries the pins 74 above referred to for shifting the collar 71 along sleeve 66, is pinned or keyed to a shaft 77 so as to rotate therewith, the shaft 77 being journaled at 78 and 79. As shown in Fig. 6, the left-hand portion 81 of the yoke 76 extends somewhat above the pin 74 carried thereby and to the upper end of the portion 81 is pivotally connected a link 82, the other end of link 82 being pivotally connected to a worm wheel 83 by means of a screw (Fig. 1). The worm wheel 83 is arranged to be driven always in the same direction by means of a worm 86 (Fig. 1) on worm shaft 87, the shaft 87 being journaled in the bearing 88. At the upper end of the worm shaft 87 is slidingly mounted a clutch member 89 which is adapted to be thrown into and out of engagement with an opposing clutch member 91. The clutch member 91 is rigidly mounted on a short shaft 92 to which is also rigidly connected by means of a pin and collar a spur gear 93 arranged to mesh with a spur gear 94 on shaft 19. Thus when the clutch member 89 is thrown into engagement with the cooperating clutch member 91 power is transmitted from the vertical drive shaft 19 through gears 94 and 93, shaft 92, clutch 91—89, shaft 87, worm 86, worm wheel 83, connecting link 82, yoke 76 and collar 71, to shift the collar along the sleeve 66, thereby to rotate the auxiliary shutter relatively to the main shutter and vary the opening in the main shutter. As above stated, the worm wheel 83 always rotates in the same direction, and the connecting link 82 and other parts should therefore be of such dimensions that when the link 82 is reciprocated in one direction to the full extent the shutter will be opened or closed the desired maximum amount, and when rotated 180° to the other extreme position the shutter will be opened or closed the desired minimum amount.

The means for controlling the clutch member 89 comprises a clutch handle 96 disposed on the left side 4 of the casing 1 and rigidly connected to a shaft 97, the shaft 97 being journaled at 98 and 99 and carrying on its inner end a yoke 101. The yoke 101 is rigidly connected to the shaft 97 and has pins projecting into the channel in clutch member 89 so that when the shaft 97 is rotated by means of the handle 96 the clutch is thrown into or out of engagement with the clutch member 91. As indicated in Fig. 5, the auxiliary clutch handle 96 must be moved upwardly to throw the clutch in and downwardly to throw the clutch out.

I have provided means for automatically stopping the movement of the auxiliary shutter relatively to the main shutter when the shutter opening has been uncovered the desired extent in beginning a series of pictures, and I have also provided means for automatically stopping the machine at the end of a series of views after the auxiliary clutch has been thrown in near the end of the series of views gradually to close the shutter opening throughout the latter portion of the series. The means for automatically opening the auxiliary clutch 89—91 when the shutter opening has been opened the desired extent comprises an arm 102 (Figs. 6 and 7) fixedly mounted on the auxiliary clutch shaft 97 near the left side wall 4. To the outer end of arm 102 is pivotally connected a vertical bar 103. A tension spring 104 is connected at its upper end to the lower end of bar 103 and at its opposite end to the frame 57 by means of a pin 106. As shown in Fig. 9, the bar 103 is provided with a stop or dog 107 which is adapted to cooperate with a latch bar 108 in a manner hereinafter described and normally hold the bar 103 in the upper position shown in Figs. 7 and 9 against the action of spring 104. When the dog 107 is hooked over the latch bar 108 the shaft 97 is in such angular position as to hold clutch member 89 in engagement with the clutch member 91 and the clutch cannot be opened so long as the bar 103 is held in its upper position. However, when the latch bar 108 is reciprocated to the left (Fig. 7) until the notch 109 registers with the dog 107, the bar 103 is released and is pulled downwardly by the spring 104, thus opening the auxiliary clutch 89—91 and discontinuing the opening of the main shutter due to the relative rotation of the auxiliary shutter.

The means for automatically stopping the machine comprises a vertical bar 111 having a slot 112 in its lower end adapted to fit over a pin 113 mounted on the main clutch arm 26 and being connected at its upper end to a tension spring 114 extending between the upper end of the bar and a pin 116 mounted on the left hand wall 4 of casing 1. As shown in Fig. 8, the bar 111 is arranged to be held in the position shown in Fig. 7 and 8 by means of a dog 117 arranged to engage the under side of the latch bar 108. However, when the latch bar 108 is reciprocated to the right into the position shown in Fig. 7 the dog 117 registers with a notch 118 in the latch bar and the bar 111 is permitted to be pulled upwardly by means of the spring 114, thus swinging the main clutch arm 26 upwardly so as to throw out the main clutch and thus stop the machine. An extension 119 is provided on the clutch arm 26 (Figs. 1 and 7) and to the end of this extension is connected a cord 121 which is connected at its other end to a movable switch contact 122 so that, when the main clutch is thrown out by rotating the arm 26 in a clockwise direction (Figs. 1 and 7) the switch 122 is opened. The switch 122 is in the circuit of the lamps 34 and 36 and by virtue of the connection 121 the circuit for the lamps is automatically closed when the machine is started and is automatically opened when the machine is stopped.

Figure 3:
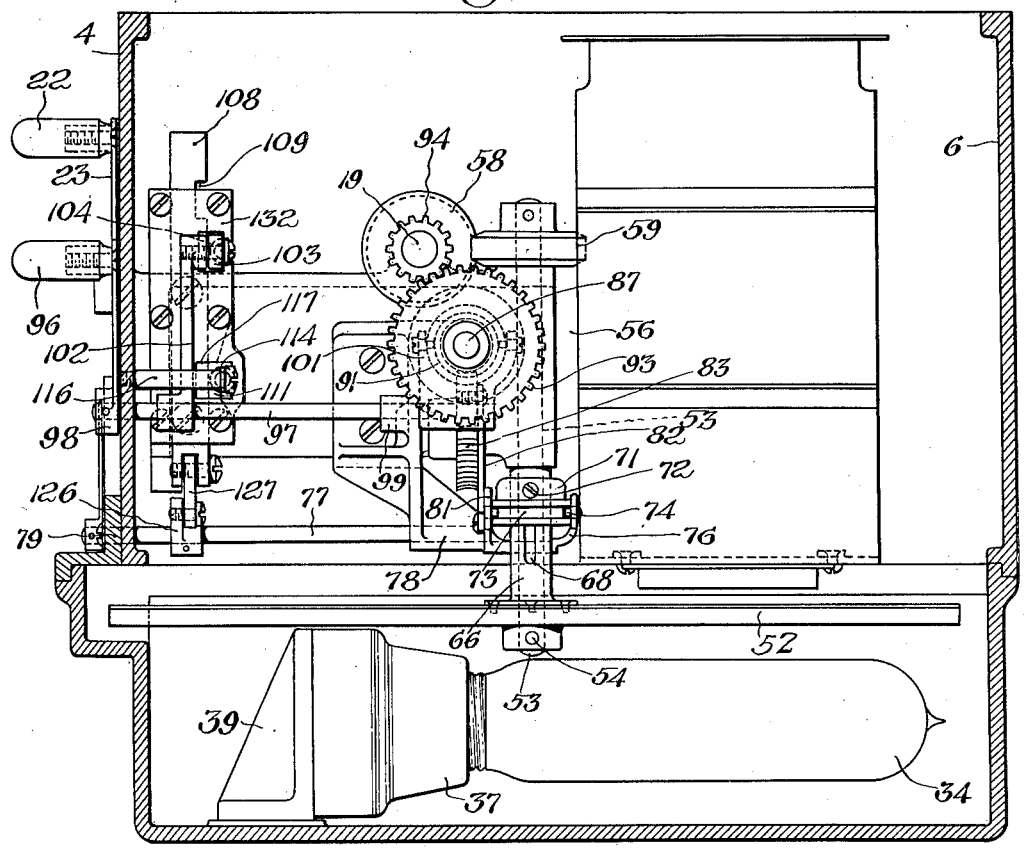
Figure 3 is a plan view of the apparatus showing the casing in section, the forward portion of the apparatus being omitted.

The control of the latch bar 108 which controls the vertical bars 103 and 111 is as follows: On the shaft 77 which carries the yoke 76 carrying the collar 71 which rotates the auxiliary shutter relatively to the main shutter is fixedly mounted an arm 126 (Fig. 7) and the outer end of arm 126 is pivotally connected to the latch bar 108 by means of a connecting link 127. The latch bar 108 is arranged to slide in a groove 128 in the plate 129, the plate 129 being mounted on the bracket 57 by means of screws 131. Over the top of the plate 129 and latch bar 108 is mounted a cover plate 132 by means of screws 133. The lower plate 129 is recessed at 134 to receive the bar 103 and at 136 to receive the bar 111. Springs may be mounted to engage the rear faces of the bars 103 and 111 so as to hold them in engagement with the latch bar 108, a suitable spring being shown, e. g., at 137 in engagement with the bar 111. The cover plate 132 preferably has openings extending therethrough as indicated in Fig. 3, instead of recesses in the sides to receive the bars 103 and 111.

The notches 109 and 118 in the latch bar 108 are so spaced apart and the connecting link 127 is of such length that the notch 109 registers with the dog 107 on bar 103 when the latch bar is in its extreme rearward position and so that the notch 118 registers with the dog 117 on bar 111 when the latch bar 108 is in its extreme forward position. Moreover, the parts are so proportioned that when the collar 71 is in its extreme forward position, corresponding to the minimum opening of the shutter, the latch bar 108 is in its extreme forward position, and when the collar 71 is in its extreme rearward position, corresponding to the maximum opening of the shutter, the latch bar 108 is in its extreme rearward position. The upper edge of the latch bar 108 is beveled as shown at 208 so that if the latch bar is moved to the rear while the dog 117 is above the latch bar, the dog will slide over the bar when pulled downwardly, the spring 137 permitting the bar 111 to move away from the latch bar sufficiently to allow the dog to pass over the latch bar. A similar provision could be made in connection with bar 103 and dog 107 but in the present construction it is impossible for the latch bar to be reciprocated while the bar 103 is in its lower position.

The operation of the system is as follows:

When the machine is at rest and the auxiliary shutter is in the position closing the shutter opening to the maximum extent, for example completely closing the opening, the main clutch handle 22 is in the upper position shown in dotted lines in Fig. 7, the cord 121 is pulled down so that the switch 122 is opened, the latch bar 108 is in its extreme forward position as shown in Fig. 7, and the bar 111 is pulled into its upper position by spring 114 so that the lower end of the slot 112 in bar 111 engages the pin 113 in its upper dotted position (Fig. 7). To start the machine the clutch handle 22 (Fig. 5) is pulled downwardly into the full line position in the respective figures, as above described, thereby closing the clutch to start the machine, allowing the switch 122 to close, lighting the lamps 34 and 36 and pulling the bar 111 downwardly into the position shown in Figs. 7 and 8. Owing to the fact that the auxiliary clutch 89—91 is being held closed by bar 103, the starting of the machine causes the auxiliary shutter to begin to open in the manner above described. As the shutter opens the latch bar 108 is moved rearwardly so that the notch 118 moves out of alinement with the dog 117 and the bar 111 is locked in its lower position as shown in full lines in Figs. 7 and 8. The main clutch handle may then be released. As the auxiliary shutter continues to uncover the main shutter aperture the latch bar continues to move rearwardly. When the shutter is open the maximum extent, for example through 180°, the latch bar 108 has reached its extreme rearward position wherein the notch 109 is in alinement with the dog 107 on bar 103. The bar 103 is thus released and pulled downwardly by means of spring 104, thus throwing out the auxiliary clutch 89—91 and stopping the movement of the auxiliary shutter relatively to the main shutter. The machine continues to operate in this condition until near the end of the series of views, that is, until it is desired to begin gradually to decrease the intensity of the images, thereby to produce the diminuendo effect at the end of the series of views, the crescendo effect having been produced at the beginning of a series of views as the auxiliary shutter gradually uncovers the main shutter opening.

To cause the auxiliary shutter to begin to close the main shutter aperture the auxiliary clutch handle 96 is moved upwardly so as to throw the clutch member 89 into engagement with the clutch member 91, the bar 103 being pulled upwardly against the action of spring 104. When the auxiliary clutch 89—91 is thrown in the shutter begins to close and the latch bar 108 begins to move forwardly. As soon as the notch 109 has moved out of alinement with the dog 107 the auxiliary clutch handle 96 may be released. The shutter continues to close until it has completely closed, or at least closed the maximum amount for which it is set, at which time the latch bar 108 has moved forwardly to the extreme position wherein the notch 118 is in alinement with the dog 117 on bar 111. When the bar 111 is then pulled upwardly by spring 114 the main clutch arm 26 is pulled upwardly owing to the engagement of the lower end of slot 112 with the pin 113 (Fig. 7). In this way the machine is stopped when the shutter is closed, the lamp circuit being opened by switch 122 at the same time. The slot 112 is provided in bar 111 so that the machine may be either started or stopped independently of the latch bar mechanism when the shutter is open and the bar 111 is locked down.

From the above it will be apparent that the variation of the intensity of the first and last portion of a series of views can be accurately and uniformly produced. Moreover, the rate of change does not depend upon any manipulation by the operator but is carried out automatically by the improved mechanism. In producing the diminuendo effect it is only necessary to move the handle 96 and to produce the crescendo effect it is only necessary to start the machine in the ordinary way. Obviously many modifications may be made in the particular mechanisms for carrying out the above disclosed functions, but the present disclosure sets forth the best embodiment of the invention of which I am at present aware.

I claim:

1. In cinematographic apparatus having a light path therethrough, the combination of a shutter in said light path, means for actuating said shutter recurrently to shutter said path, means operating in synchronism with said first means for gradually varying the shuttering effect of the shutter while in operation, and automatic means whereby said second means is started when said first means is started.

2. In cinematographic apparatus having a light path therethrough, the combination of a shutter in said light path, means for actuating said shutter recurrently to shutter said path, means operated by said first means for gradually varying the shuttering effect of the shutter while in operation, and means controlled by said second means for controlling said first means.

3. In cinematographic apparatus having a light path therethrough, the combination of a shutter in said light path, means for actuating said shutter recurrently to shutter said path, means geared to said first means for gradually varying the shuttering effect of the shutter while in operation, and automatic means for starting one of said means when the other of said means is started.

4. In cinematographic apparatus having a light path therethrough, the combination of a shutter in said light path, means for varying the opening in said shutter, means for continuously moving said shutter across said path, means operating in synchronism with said moving means for actuating said varying means, and means responsive to one of said means for stopping the other of said means.

5. In cinematographic apparatus having a light path therethrough, the combination of a shutter in said light path, means for actuating said shutter recurrently to shutter said path, means operating in sychronism with said actuating means for gradually increasing the shutter opening while the shutter is in operation, and automatic means whereby said second means is started when said first means is started.

6. In cinematographic apparatus having a light path therethrough, the combination of a shutter in said light path, means for actuating said shutter recurrently to shutter said path, means for gradually varying the shutter opening while the shutter is in operation, and means for automatically stopping said first means in response to said second means.

7. In cinematographic apparatus having a light path therethrough, the combination of a shutter in said light path, means for actuating said shutter recurrently to shutter said path, means for gradually varying the shutter opening while the shutter is in operation, and means for automatically stopping said two means in response to said second means.

8. Cinematographic apparatus comprising a main shutter having a light opening therein, an auxiliary shutter for controlling the effective size of said opening, concentric shafts for driving the respective shutters, means for rotating the two shafts in synchronism, means for actuating said adjustable means while the shafts are rotating in sychronism, and automatic means whereby said second means is started when said first means is started.

9. Cinematographic apparatus comprising a shutter having a light opening therein, means for continuously moving the shutter recurrently to shutter the transmission of light, means for varying the light transmission through the shutter opening while the shutter is in operation, and means controlled by the light varying means automatically to change the shutter motion.

10. Cinematographic apparatus comprising a shutter having a light opening therein, means for continuously moving the shutter recurrently to shutter the transmission of light, means for varying the light transmission through the shutter opening while the shutter is in operation, and means controlled by the light varying means automatically to stop the shutter when the light transmission is reduced to a predetermined amount.

11. Cinematographic apparatus comprising a shutter having a light opening therein, means for continuously moving the shutter recurrently to shutter the transmission of light, means for varying the effective size of the shutter opening while the shutter is in operation, and means controlled by the opening varying means for controlling the motion of the shutter.

12. Cinematographic apparatus comprising a shutter having a light opening therein, means for continuously moving the shutter recurrently to shutter the transmission of light, means for varying the effective size of the shutter opening while the shutter is in operation, means for automatically terminating the variation of shutter opening when the opening reaches a predetermined effective size, and means for automatically stopping the shutter when the opening reaches another predetermined effective size.

13. Cinematographic apparatus comprising a main shutter having a light opening therein, an auxiliary shutter for varying the effective opening in the main shutter, driving means for continuously moving the two shutters in synchronism recurrently to shutter the transmission of light, adjusting means actuated by the driving means for moving the auxiliary shutter relatively to the main shutter while the shutters are in operation, thereby to vary the effective opening in the main shutter, means for automatically disengaging the adjusting means from the driving means when the effective opening has been varied a predetermined amount in one sense, whereby the effective opening is then maintained constant, and means for automatically disconnecting both shutters from the driving means when the effective opening has been varied a predetermined amount in the opposite sense.

14. Cinematographic apparatus comprising a plurality of shutters, driving means to rotate the shutters in synchronism across a light path, varying means to rotate the shutters relatively to each other so as to vary the effective light opening thereof, a lock member arranged to be actuated by the varying means to control the driving means, and a latch member normally held in position by the lock member, the said members being so arranged that when the shutters have been relatively rotated a predetermined amount the lock member is released, thereby varying the velocity of the driving means.

15. Cinematographic apparatus comprising a plurality of shutters, means for driving the shutters in synchronism across a light path, means for rotating the shutters relatively to each other so as to vary the effective light opening thereof, a lock member arranged to be actuated by the rotating means, a latch member arranged to be held in position by the lock member and to render the rotating means inoperative when released by the lock member, the lock member being arranged to release the latch member when the shutters have been relatively rotated a predetermined amount.

16. Cinematographic apparatus comprising a plurality of shutters, means for driving the shutters in synchronism across a light path, means for rotating the shutters relatively to each other so as to vary the effective light opening thereof, a lock member arranged to be moved back and forth by the rotating means between two extreme positions corresponding respectively to minimum and maximum effective light openings, a latch member controlled by the lock member for stopping the driving means when released by the lock member and arranged to be released by the lock member when the latter is in the first extreme position, a latch member controlled by the lock member for rendering the rotating means inoperative when released by the lock member and arranged to be released by the lock member when the latter is in the other extreme position.

17. In cinematographic apparatus having a light path therethrough, the combination of a shutter in said light path, means for actuating said shutter recurrently to shutter said path, means for gradually varying the shuttering effect of the shutter, and means for automatically stopping said variation, said last means including controller automatically actuated independently of the shuttering means when said effect reaches a predetermined value.

18. In cinematographic apparatus having a light path therethrough, the combination of a shutter in said light path, means for actuating said shutter recurrently to shutter said path, means for gradually varying the shuttering effect of the shutter, and means for automatically stopping said variation, said last means including a spring-actuated controller arranged to be tripped when said effect reaches a predetermined value.

19. In cinematographic apparatus having a light path therethrough, the combination of a shutter in said light path, means for actuating said shutter recurrently to shutter said path, means operating in synchronism with said means for gradually varying the shuttering effect of the shutter between certain limits, and means for automatically stopping said variation at one of said limits and for automatically stopping said shutter at the other of said limits.

20. In cinematographic apparatus having a light path therethrough, the combination of a shutter in said light path, means for actuating said shutter recurrently to shutter said path, means operating in synchronism with said means for gradually varying the shuttering effect of the shutter between certain limits, and control means operating in synchronism with said last means between positions corresponding to said limits, and means responsive to said last means for stopping said variation at one of said limits and for stopping said shutter at the other of said limits.

21. In cinematographic apparatus having a light path therethrough, the combination of a shutter in said light path, means for actuating said shutter recurrently to shutter said path, means for gradually varying the shutter opening between certain limits, and means for automatically holding said varying means in operative condition while said opening is varied from one limit to the other limit and back to the first limit.

22. In cinematographic apparatus having a light path therethrough, the combination of a shutter in said light path, means for actuating said shutter recurrently to shutter said path, means for gradually varying the shutter opening between certain limits, and means for automatically rendering said varying means inoperative when said opening is restored to the first limit.

23. In cinematographic apparatus having a light path therethrough, the combination of a shutter in said light path, means for actuating said shutter recurrently to shutter said path, means for gradually varying the shutter opening between certain limits, a clutch for rendering said varying means inoperative, and means for holding said clutch in operative position when said varying means is in one limiting position.

Signed by me at Boston, Massachusetts, this sixth day of June, 1917.

WILLIAM BURTON WESCOTT.